(12) United States Patent
Song

(10) Patent No.: US 10,931,174 B2
(45) Date of Patent: Feb. 23, 2021

(54) FLUX SHIELD HAVING SPLIT STRUCTURES AND GENERATOR INCLUDING THE SAME

(71) Applicant: DOOSAN HEAVY INDUSTRIES CONSTRUCTION CO., LTD., Gyeongsangnam-do (KR)

(72) Inventor: Daeil Song, Busan (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 188 days.

(21) Appl. No.: 15/347,723

(22) Filed: Nov. 23, 2016

(65) Prior Publication Data

US 2017/0170710 A1    Jun. 15, 2017

(30) Foreign Application Priority Data

Dec. 15, 2015    (KR) .................. 10-2015-0179321

(51) Int. Cl.
*H02K 11/22*  (2016.01)
*H02K 11/01*  (2016.01)
*H02K 3/42*   (2006.01)

(52) U.S. Cl.
CPC .......... *H02K 11/0141* (2020.08); *H02K 3/42* (2013.01)

(58) Field of Classification Search
CPC ...... H02K 11/00; H02K 11/01; H02K 11/022; H02K 3/42; H01K 11/022
USPC .................................................. 310/216.108
See application file for complete search history.

(56) References Cited

U.S. PATENT DOCUMENTS

| 3,553,508 A * | 1/1971 | Stcherbatcheff | G04C 3/16 310/152 |
| 3,714,477 A * | 1/1973 | Gott | H02K 3/42 310/256 |
| 3,886,387 A | 5/1975 | Graham et al. | |
| 4,031,422 A * | 6/1977 | Armor | H02K 1/20 310/256 |
| 6,140,730 A * | 10/2000 | Tkaczyk | H02K 21/24 310/181 |
| 8,922,950 B2 * | 12/2014 | Singleton | G01R 33/093 360/319 |
| 2011/0241455 A1 * | 10/2011 | Yoshida | H02K 1/12 310/44 |
| 2012/0146752 A1 * | 6/2012 | Fullerton | H01F 7/0205 335/306 |

FOREIGN PATENT DOCUMENTS

DE    759075 C    4/1951
JP    58-009534 A    1/1983
(Continued)

OTHER PUBLICATIONS

A European Search Report dated Apr. 28, 2017 in connections with European Patent Application No. 16198935.5 which corresponds to the above-referenced U.S. Application.
(Continued)

*Primary Examiner* — Shawki S Ismail
*Assistant Examiner* — Monica Mata
(74) *Attorney, Agent, or Firm* — Invenstone Patent, LLC

(57) ABSTRACT

Disclosed herein are a flux shield and a generator including the same and, more particularly, a flux shield including split structures and a generator including the same.

20 Claims, 7 Drawing Sheets

(56) References Cited

FOREIGN PATENT DOCUMENTS

| | | | |
|---|---|---|---|
| JP | 60-234437 | A | 11/1985 |
| JP | 09182347 | A | 7/1997 |
| JP | 2003309958 | A | 10/2003 |
| KR | 2019990041597 | U | 12/1999 |
| KR | 200206558 | Y1 | 12/2000 |
| KR | 1020050013443 | A | 2/2005 |
| KR | 10-1474479 | B1 | 12/2014 |
| KR | 101489238 | B1 | 1/2015 |

OTHER PUBLICATIONS

An Office Action in connection with Korean Application No. 10-2015-0179321, which corresponds to the above-referenced U.S. Application.
A Korean Notice of Allowance dated Jul. 20, 2018 in connection with Korean Patent Application No. 10-2015-0179321 which corresponds to the above-referenced U.S. application.

* cited by examiner

FLUX SHIELD HAVING SPLIT STRUCTURES AND GENERATOR INCLUDING THE SAME

CROSS REFERENCE TO RELATED APPLICATION

The present application claims the benefit of Korean Patent Application No. 10-2015-0179321 filed in the Korean Intellectual Property Office on Dec. 15, 2015, the entire contents of which are incorporated herein by reference.

BACKGROUND

The present disclosure relates to a flux shield and a generator including the same and, more particularly, to a flux shield including split structures and a generator including the same.

FIG. 1 is a diagram showing a generator having flux shields for shielding a magnetic flux mounted thereon on both sides thereof, and FIG. 2 is a diagram showing one end portion of the generator from which a rotary rotor has been removed. Furthermore, FIG. 3 is a plan schematic diagram showing the flux shield of FIG. 2, and FIG. 4 is a diagram showing the state in which a magnetic flux is introduced form the outside to the inside of the generator.

Referring to FIGS. 1 to 4, similar to a large amount of a magnetic flux is generated from both ends of a magnet, a large amount of a magnetic flux is generated from both ends of the generator. As shown in FIG. 4, the generated magnetic flux is introduced from the outside to the inside of the generator (refer to the dotted arrows). The magnetic flux is saturated at both ends of the generator due to the introduced magnetic flux. Accordingly, in order to prevent the saturation of the magnetic flux from being generated at both ends of the generator, a step is formed at the end portion of a core or a magnetic flux shield plate is installed thereon.

If the magnetic flux shield plate according to a conventional technology is installed, it is fabricated to fully cover both ends of the generator. In this case, since the magnetic flux shield plates have to be fabricated in an integrated manner, the cost of production of the magnetic flux shield plate and the cost of materials thereof are increased.

Furthermore, if both ends of the generator have a complicated structure, the cost of production is further increased.

Accordingly, there is a need for a technology in which a magnetic flux shield plate can be fabricated at a low cost.

BRIEF SUMMARY

A flux shield according to an aspect of the present disclosure is mounted on both ends of the generator and shields a magnetic flux introduced from the outside to the inside of the generator. The flux shield may include two or more split structures spaced apart from each other at specific intervals.

In an embodiment of the present disclosure, the flux shield may be formed to have a size and shape corresponding to both ends of a generator.

In this case, the flux shield may have a circular shape formed to have the diameter of a length corresponding to the width of both ends of the generator.

In an embodiment of the present disclosure, the split structure may include a radial point symmetry structure on the plane. Furthermore, the split structure may include a left and right symmetry structure or a top and bottom symmetry structure on the plane.

In some embodiments, the flux shield may include one or more step structures corresponding to a shape of both ends of a generator on which the flux shield is mounted, and may have split structures formed along the curved portions of the step structures.

In an embodiment of the present disclosure, the flux shield may be made of copper or aluminum or a material including copper and aluminum.

In an embodiment of the present disclosure, the interval between the split structures may be 1 to mm.

Furthermore, the flux shield may have a structure split into 2 to 12 pieces by the split structure.

Furthermore, an embodiment of the present disclosure may provide a generator including flux shields mounted on both ends of the generator and adapted to shield a magnetic flux from the outside to the inside of the generator. The flux shield of the generator according to an aspect of the present disclosure may have two or more split structures spaced apart from each other at specific intervals.

The flux shield according to an embodiment of the present disclosure includes the two or more split structures spaced apart from each other at specific intervals. Accordingly, the flux shield which can be easily fabricated, can be easily assembled and managed, and can reduce the cost of production and assembly and management costs and a generator including the same can be provided.

Furthermore, the flux shield according to an embodiment of the present disclosure can be fabricated to have split structures of various forms, such as a radial point symmetry structure, a left and right symmetry structure or a top and bottom symmetry structure. Accordingly, the flux shield can be easily fabricated compared to a flux shield according to a conventional technology, and thus the cost of production can be significantly reduced.

Furthermore, the flux shield according to an embodiment of the present disclosure has the structure split into two or more pieces. Accordingly, a mounting and assembly task can be performed more easily compared to a conventional technology in mounting the flux shields on both ends of a generator.

Furthermore, the flux shield according to an embodiment of the present disclosure can be easily fabricated compared to a flux shield according to a conventional technology because it includes one or more step structures corresponding to a shape of both ends of a generator and has the split structures formed along the curved portions of the step structures. Accordingly, the cost of production can be significantly reduced, and a mounting and assembly task can be performed more easily compared to a conventional technology in mounting the flux shields on both ends of a generator.

Furthermore, the flux shield according to an embodiment of the present disclosure can be easily applied to generators of various specifications in addition to a generator of specific specifications because the interval between the split structures and the number of split pieces can be properly changed depending on the specifications of a generator and/or a designer's intention.

Furthermore, the generator according to an embodiment of the present disclosure can significantly reduce the cost of production and production costs because it includes the flux shields according to an embodiment of the present disclosure.

BRIEF DESCRIPTION OF THE DRAWINGS

The above and other objects, features and other advantages of the present invention disclosure will be more clearly understood from the following detailed description taken in conjunction with the accompanying drawings, in which.

DETAILED DESCRIPTION

Hereinafter, embodiments of the present disclosure are described in detail with reference to the accompanying drawings. Prior to the description, terms or words used in this specification and the claims should not be construed as being common or having those found in dictionaries, but should be construed having meanings and concepts which comply with the technical spirit of the present disclosure.

In the entire specification, when it is described that one member is placed "on or over" the other member, it means that one member may adjoin the other member and a third member may be interposed between the two members. In the entire specification, unless explicitly described to the contrary, the word "include, have, or comprise" will be understood to imply the inclusion of stated elements but not the exclusion of any other elements.

Figure 5:
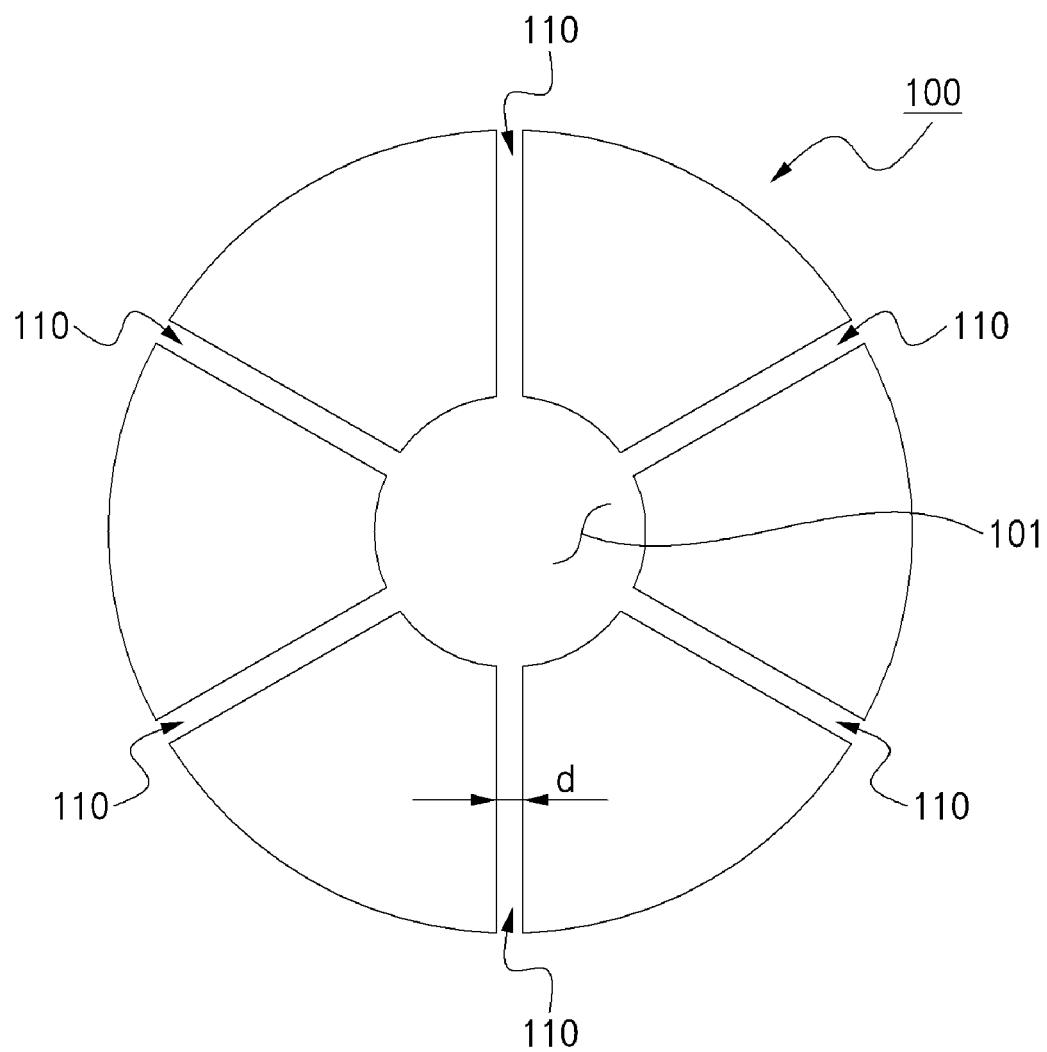
FIG. 5 is a plan schematic diagram showing a flux shield according to an embodiment of the present disclosure.
Figure 6A:
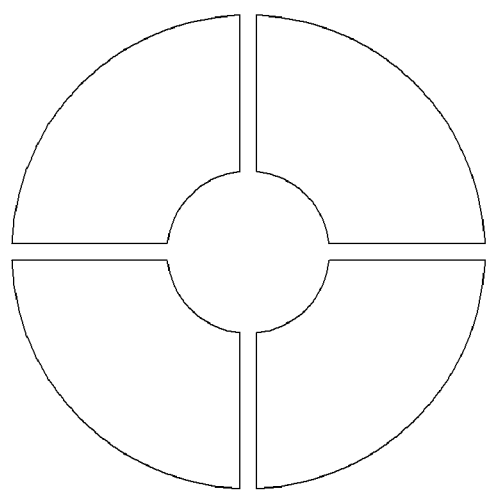
FIG. 6A is a plan schematic diagram showing flux shields according to an embodiment of the present disclosure.
Figure 6B:
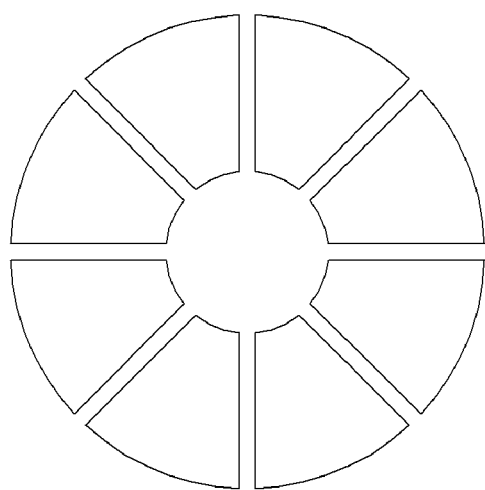
FIG. 6B is a plan schematic diagram showing flux shields according to another embodiment of the present disclosure.
Figure 6C:
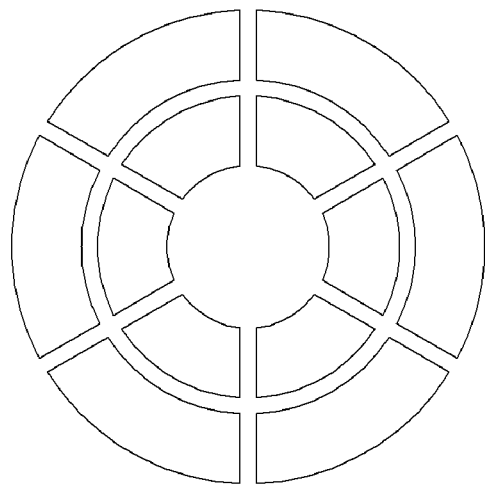
FIG. 6C is a plan schematic diagram showing flux shields according to still another embodiment of the present disclosure.
Figure 6D:
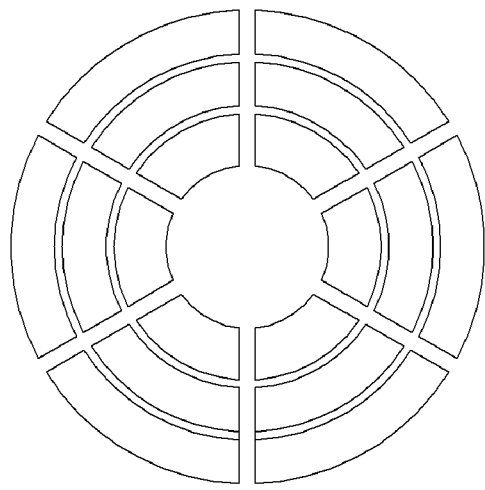
FIG. 6D is a plan schematic diagram showing flux shields according to yet another embodiment of the present disclosure.

FIG. 5 is a plan schematic diagram showing a flux shield according to an embodiment of the present disclosure.

Figure 1:
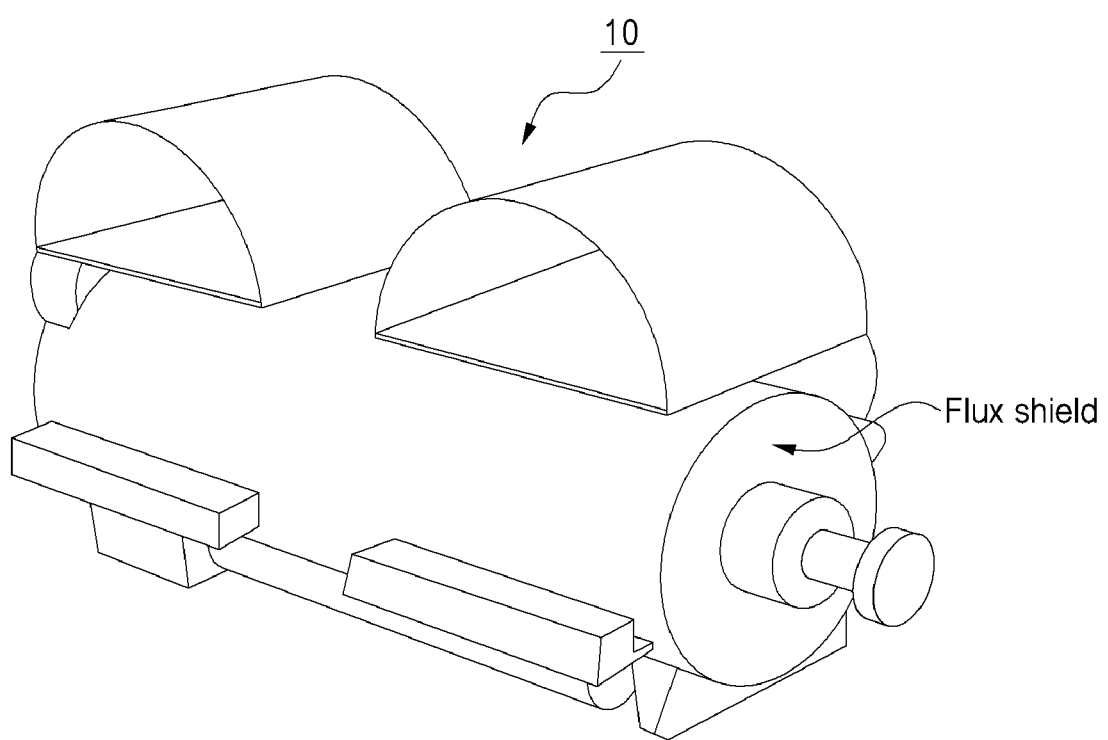
FIG. 1 is a diagram showing a generator having flux shields for shielding a magnetic flux mounted thereon on both sides thereof.
Figure 2:
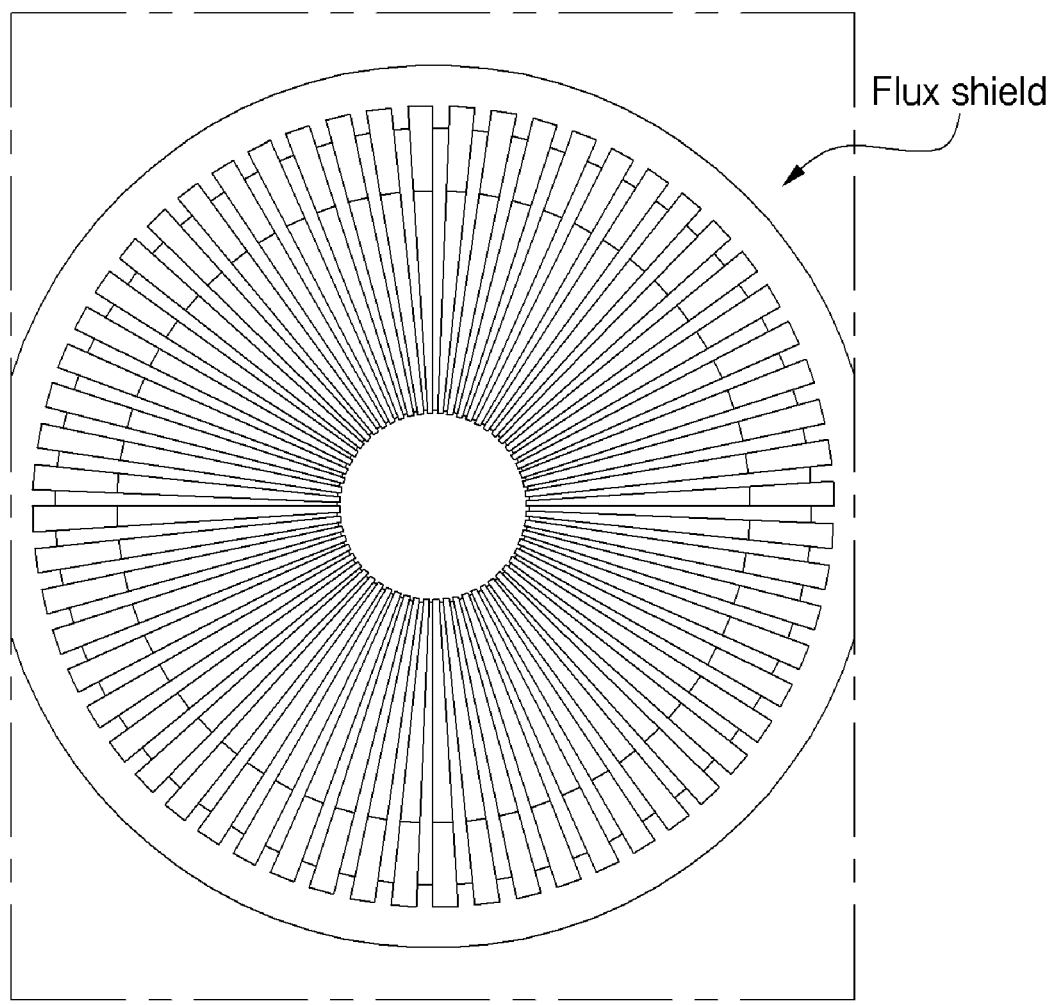
FIG. 2 is a diagram showing one end portion of the generator from which a rotary rotor has been removed.
Figure 3:
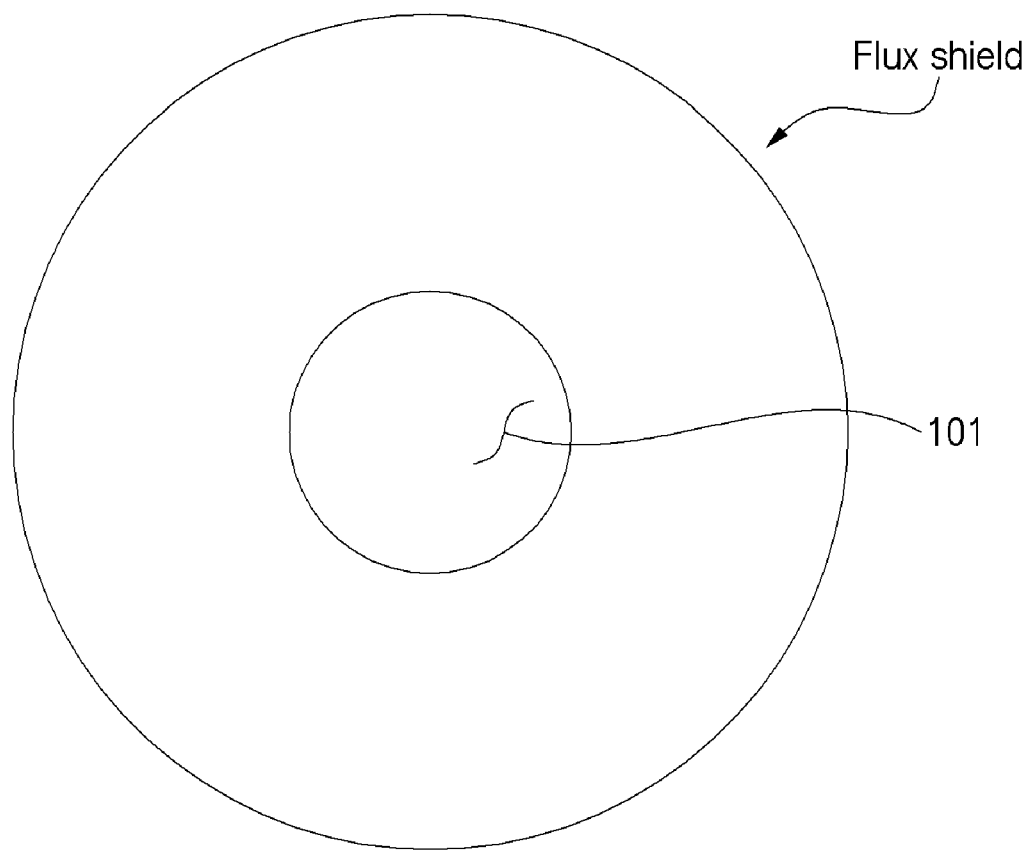
FIG. 3 is a plan schematic diagram showing the flux shield of FIG. 2.
Figure 4:
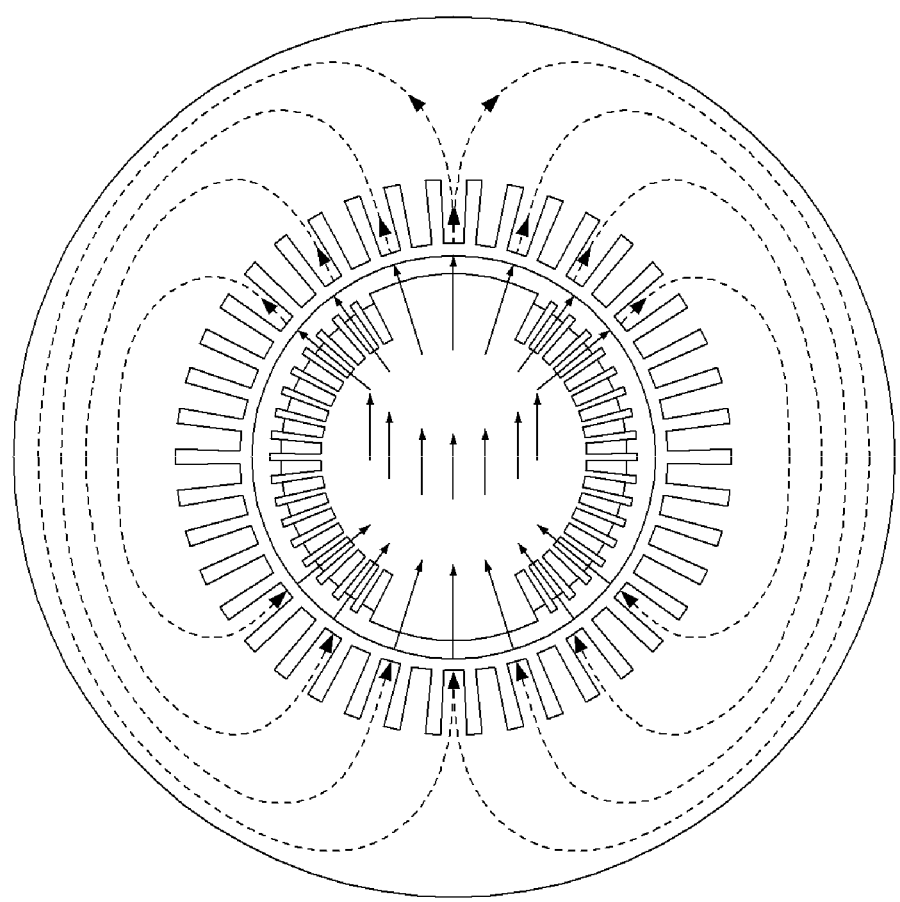
FIG. 4 is a diagram showing the state in which a magnetic flux is introduced form the outside to the inside of the generator.

As shown in FIG. 5, the flux shield 100 according to the present embodiment is mounted on both ends of the generator 10 (refer to FIG. 1) and shields a magnetic flux introduced from the outside to the inside of the generator. The flux shield 100 may include two or more split structures 110 (such as gaps or spaces between structures) spaced apart from each other at specific intervals "d."

Specifically, the interval between the split structures may be a value in the range of 1 to 100 mm. If the interval between the split structures is less than 1 mm, a magnetic flux shield effect may be achieved, but a production cost reduction effect is very small. If the interval between the split structures is more than 100 mm, a target effect may not be achieved because the magnetic flux shield effect is significantly reduced.

Furthermore, in order to effectively shield the magnetic flux introduced from the outside to the inside of the generator, a shape on the plane of the flux shield 100 may have a size and shape corresponding to both ends of the generator 10, as shown in FIG. 5.

Furthermore, a shape on the plane of the flux shield 100 may be a circular shape having the diameter of a length corresponding to the width of both ends of the generator 10. If a shape of both ends of the generator 10 is a quadrangle, the flux shield 100 may also be fabricated to have a quadrangle having a shape and size corresponding to the quadrangle.

FIG. 6 are plan schematic diagrams showing flux shields according to embodiments of the present disclosure.

Referring to FIG. 6, a split structure of the flux shield 100 according to the present embodiments may include a radial point symmetry structure on a plane. Furthermore, a split structure of the flux shield 100 according to the present embodiment may include a left and right symmetry structure or a top and bottom symmetry structure on the plane.

In this case, the flux shield 100 may have a structure split into 2 to 12 pieces by the split structures. If the flux shield 100 has a structure split into more than 12 pieces by the split structures, there may be increases in the cost of production and the manufacturing time may be increased. Furthermore, if the split structure is a structure split into more than 12 pieces, additional time may be needed for a production assembly process because a process of assembling the split structures by mounting them on both ends of the generator is complicated.

A material forming the flux shield 100 according to the present embodiment is not specially limited to any material if the material can be mounted on both ends of the generator and can shield a magnetic flux introduced from the outside to the inside of the generator. For example, the flux shield 100 may be made of copper or aluminum or a material including copper and aluminum.

Figure 7:
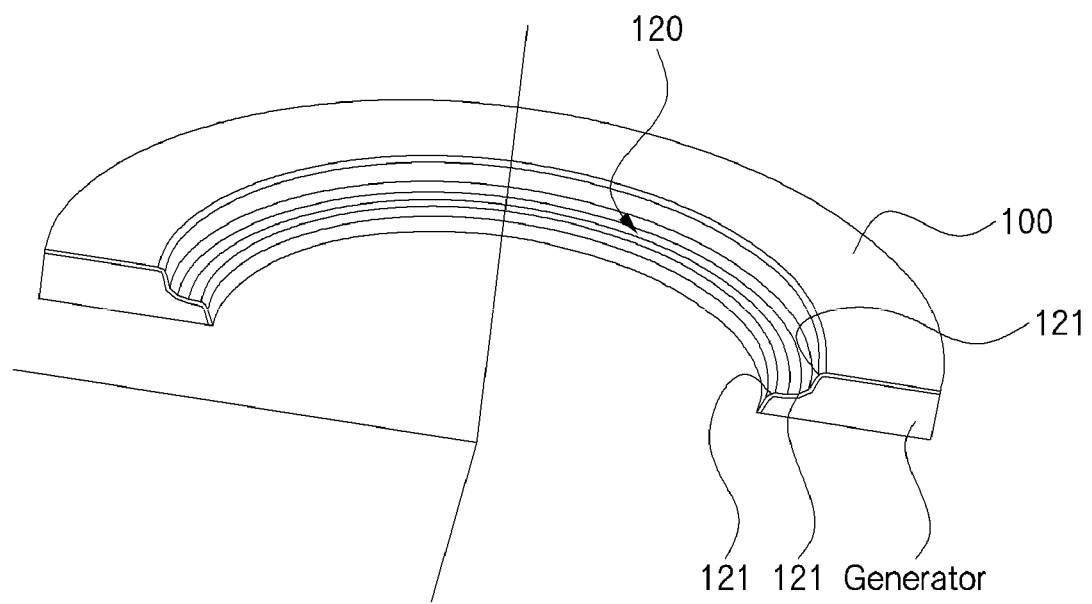
FIG. 7 is a perspective view showing the state in which only one end portion of the generator has been extracted and the shape of the end portion has been cut.

FIG. 7 is a perspective view showing the state in which only one end portion of the generator has been extracted and the shape of the end portion has been cut.

Referring to FIG. 7, the flux shield 100 according to the present embodiment may include one or more step structures 120 corresponding to a shape of both ends of the generator 10 on which the flux shield 100 is mounted. In this case, the split structure may be formed along the curved portion 121 of the step structure 120.

A flux shield according to a conventional technology does not adopt a split structure in forming the above-described step structure, but is fabricated in an integrated manner. For this reason, the flux shield according to a conventional technology requires a very high level of a technology in its fabrication. As a result, there is a problem in that the cost of production rises.

In contrast, the flux shield 100 according to the present embodiment can be fabricated very easily because the split structure is formed along the curved portion 121 of the step structure 120. As a result, the cost of production can be reduced.

In this case, as described above, the interval between the split structures formed along the curved portions 121 of the step structures 120 may be in the range of 1 to 100 mm.

Furthermore, an embodiment of the present disclosure may provide a generator having the flux shields 100 according to the present embodiment mounted on both ends thereof.

The flux shield 100 according to the present embodiment includes the structures and split structures corresponding to both ends of the generator. Accordingly, the flux shield 100 can be easily mounted and assembled into both ends of the generator.

As a result, the generator according to the present embodiment includes the flux shield 100 which can be easily mounted and assembled. Accordingly, the time taken for a process of fabricating a generator can be significantly reduced.

As described above, the flux shield according to an embodiment of the present disclosure includes the two or more split structures spaced apart from each other at specific intervals. Accordingly, the flux shield which can be easily fabricated, can be easily assembled and managed, and can reduce the cost of production and assembly and management costs and a generator including the same can be provided.

Furthermore, the flux shield according to an embodiment of the present disclosure can be fabricated to have split structures of various forms, such as a radial point symmetry structure, a left and right symmetry structure or a top and bottom symmetry structure. Accordingly, the flux shield can be easily fabricated compared to a flux shield according to a conventional technology, and thus the cost of production can be significantly reduced.

Furthermore, the flux shield according to an embodiment of the present disclosure has the structure split into two or more pieces. Accordingly, a mounting and assembly task can be performed more easily compared to a conventional technology in mounting the flux shields on both ends of a generator.

Furthermore, the flux shield according to an embodiment of the present disclosure can be easily fabricated compared to a flux shield according to a conventional technology because it includes one or more step structures corresponding to a shape of both ends of a generator and has the split structures formed along the curved portions of the step structures. Accordingly, the cost of production can be significantly reduced, and a mounting and assembly task can be performed more easily compared to a conventional technology in mounting the flux shields on both ends of a generator.

Furthermore, the flux shield according to an embodiment of the present disclosure can be easily applied to generators of various specifications in addition to a generator of specific specifications because the interval between the split structures and the number of split pieces can be properly changed depending on the specifications of a generator and/or a designer's intention.

Furthermore, the generator according to an embodiment of the present disclosure can significantly reduce the cost of production and production costs because it includes the flux shields according to an embodiment of the present disclosure.

In the detailed description of the present disclosure, only special embodiments have been described. It is however to be understood that the present disclosure is not limited to the special embodiments, but should be construed as including all of changes, equivalents and substitutes within the spirit and range defined by the appended claims.

That is, the breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

What is claimed is:

1. A flux shield mounted on either end of a generator and adapted to shield a magnetic flux introduced from an outside to an inside of the generator, the flux shield comprising:
a split structure formed by two or more separate pieces spaced apart from each other in a circumferential direction by a specific interval,
wherein each of the two or more separate pieces is discretely formed as an arc-shaped segment of an annulus corresponding to a surface area of one end of the generator, the arc-shaped segment of the annulus including a first surface perpendicular to an axis of the generator and a second surface formed at an inner diameter of the annulus,
wherein, for each of the two or more separate pieces, the first and second surfaces communicate with each other via a curved portion extending in the circumferential direction of the arc-shaped segment and corresponding to a structure of the one end of the generator, the curved portion including a stepped structure formed of a plurality of steps radially arranged between the first and second surfaces.

2. The flux shield of claim 1, wherein the flux shield has a size and shape corresponding to the ends of the generator.

3. The flux shield of claim 2, wherein the annulus has a shape of a circle whose diameter corresponds to a width of the ends of the generator.

4. The flux shield of claim 2, wherein the curved portion includes a plurality of curvatures radially arranged between the first and second surfaces.

5. The flux shield of claim 1, wherein the split structure exhibits radial point symmetry on a plane.

6. The flux shield of claim 1, wherein the split structure exhibits left and right symmetry or top and bottom symmetry on a plane.

7. The flux shield of claim 1, wherein the two or more separate pieces of the split structure include a first set of radially inwardly disposed separate pieces comprising the curved portion and at least one second set of radially outwardly disposed separate pieces respectively encircle the radially inwardly disposed separate pieces, the radially outwardly disposed separate pieces spaced apart from each other in the circumferential direction by the specific interval.

8. The flux shield of claim 1, wherein the flux shield includes copper or aluminum.

9. The flux shield of claim 1, wherein the specific interval is in the range of 1 to 100 mm.

10. The flux shield of claim 1, wherein the two or more separate pieces of the split structure number between two and twelve.

11. A flux shield mounted on either end of a generator and adapted to shield a magnetic flux introduced from an outside to an inside of the generator, the flux shield comprising:
a first split structure formed by two or more first separate pieces spaced apart from each other in a circumferential direction by a specific interval, each of the two or more first separate pieces having an inner circumferential side and an outer circumferential side disposed radially outward from the inner circumferential side; and
a second split structure formed by two or more second separate pieces spaced apart from each other in the circumferential direction by the specific interval, the second split structure disposed radially outward from the first split structure so as to encircle the outer circumferential sides of the two or more first separate pieces.

12. The flux shield of claim 11, wherein each of the first and second separate pieces is discretely formed as an arc-shaped segment of an annulus corresponding to a surface area of one end of the generator, the arc-shaped segment of the annulus including a first surface perpendicular to an axis of the generator and a second surface formed at an inner diameter of the annulus.

13. The flux shield of claim 11, wherein the first and second surfaces of the first split structure communicate with each other via a curved portion extending in the circumferential direction of the arc-shaped segment and corresponding to a structure of the one end of the generator, the curved portion including a stepped structure formed of a plurality of steps radially arranged between the first and second surfaces.

14. A generator comprising a flux shield mounted on either end of the generator and adapted to shield a magnetic flux introduced from an outside to an inside of the generator, wherein the flux shield comprises:
   a split structure formed by two or more separate pieces spaced apart from each other in a circumferential direction by a specific interval,
   wherein each of the two or more separate pieces is discretely formed as an arc-shaped segment of an annulus corresponding to a surface area of one end of the generator, the arc-shaped segment of the annulus including a first surface perpendicular to an axis of the generator and a second surface formed at an inner diameter of the annulus, and
   wherein, for each of the two or more separate pieces, the first and second surfaces communicate with each other via a curved portion extending in the circumferential direction of the arc-shaped segment and corresponding to a structure of the one end of the generator, the curved portion including a stepped structure formed of a plurality of steps radially arranged between the first and second surfaces.

15. The generator of claim 14, wherein the flux shield has a size and shape corresponding to the ends of the generator.

16. The generator of claim 15, wherein the annulus has a diameter corresponding to a width of the ends of the generator.

17. The flux shield of claim 14, wherein the curved portion includes a plurality of curvatures radially arranged between the first and second surfaces.

18. The generator of claim 14, wherein the split structure includes radial point symmetry on a plane.

19. The generator of claim 14, wherein the split structure includes a left and right symmetry or a top and bottom symmetry on a plane.

20. The generator of claim 14, wherein the two or more separate pieces of the split structure include a first set of radially inwardly disposed separate pieces comprising the curved portion and at least one second set of radially outwardly disposed separate pieces respectively encircle the radially inwardly disposed separate pieces, the radially outwardly disposed separate pieces spaced apart from each other in the circumferential direction by the specific interval.

* * * * *